United States Patent
Tani et al.

(10) Patent No.: US 10,635,923 B2
(45) Date of Patent: Apr. 28, 2020

(54) IMAGE PROCESSING APPARATUS

(71) Applicant: FUJITSU TEN LIMITED, Kobe-shi, Hyogo (JP)

(72) Inventors: Yasushi Tani, Kobe (JP); Takashi Kono, Kobe (JP); Junji Hashimoto, Kobe (JP); Tomohide Kasame, Kobe (JP); Teruhiko Kamibayashi, Kobe (JP); Hiroki Murasumi, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 22 days.

(21) Appl. No.: 15/410,369

(22) Filed: Jan. 19, 2017

(65) Prior Publication Data

US 2017/0220890 A1 Aug. 3, 2017

(30) Foreign Application Priority Data

Feb. 2, 2016 (JP) ................. 2016-018348

(51) Int. Cl.
| | | |
|---|---|---|
| G06K 9/46 | (2006.01) | |
| G06T 7/13 | (2017.01) | |
| B60R 11/04 | (2006.01) | |
| G06K 9/00 | (2006.01) | |
| G06T 7/12 | (2017.01) | |
| G06T 7/64 | (2017.01) | |
| G06T 7/68 | (2017.01) | |
| G02B 27/00 | (2006.01) | |

(52) U.S. Cl.
CPC ............ *G06K 9/4604* (2013.01); *B60R 11/04* (2013.01); *G06K 9/00791* (2013.01); *G06T 7/12* (2017.01); *G06T 7/13* (2017.01); *G06T 7/64* (2017.01); *G06T 7/68* (2017.01); *G02B 27/0006* (2013.01); *G06T 2207/10024* (2013.01)

(58) Field of Classification Search
CPC ......... G06K 9/4604; G06T 7/13; G06T 7/136; G02B 27/0006; B60R 11/04
See application file for complete search history.

(56) References Cited

U.S. PATENT DOCUMENTS

| | | | |
|---|---|---|---|
| 2007/0115357 A1* | 5/2007 | Stein ................... | B60Q 1/0023 348/148 |
| 2015/0042805 A1* | 2/2015 | Okumura ........... | G06K 9/00791 348/148 |
| 2015/0323785 A1* | 11/2015 | Fukata .................. | G08G 1/166 348/148 |

(Continued)

FOREIGN PATENT DOCUMENTS

| | | |
|---|---|---|
| JP | 2009-130700 A | 6/2009 |
| JP | 2010-014494 A | 1/2010 |
| JP | 2014-037239 A | 2/2014 |

*Primary Examiner* — Pinalben Patel
(74) *Attorney, Agent, or Firm* — Oliff PLC

(57) ABSTRACT

An image processing apparatus includes a detector, an estimator and a determiner. The detector detects a candidate region of a captured image captured by a camera, the candidate region serving as a candidate for a water drop region affected by a water drop on the lens of the camera, based on an edge strength of each pixel in the captured image. The estimator estimates, based on the candidate region, a circle that includes the candidate region. The determiner determines whether or not the candidate region is part of the water drop region based on the edge strength of some of the pixels in the circle.

2 Claims, 13 Drawing Sheets

(56) References Cited

U.S. PATENT DOCUMENTS

2016/0162740 A1\* 6/2016 Takemura .......... G06K 9/00791
       348/148
2017/0270381 A1\* 9/2017 Itoh ........................ B60Q 1/143
2018/0096474 A1\* 4/2018 Guerreiro ............. G06T 7/0002

\* cited by examiner

IMAGE PROCESSING APPARATUS

BACKGROUND OF THE INVENTION

Field of the Invention

The invention relates to an image processing apparatus.

Description of the Background Art

Conventionally, a camera that is mounted on a vehicle, as an image capturing part that captures an image of surrounding of the vehicle, has been known. The images captured by the camera are provided to, for example, a driver of the vehicle.

However, there is a case where rain drops or water drops due to snow are attached to a lens of the camera because of, for example, rainfall or snowfall. Thus, a water drop removing apparatus has been proposed to remove the water drops on the lens by a manual operation by the driver of the vehicle by outputting compressed air toward the lens of the camera.

However, in a case where the water drop removing apparatus is manually operated, it is very difficult to keep the lens of the camera free from water drops. Thus, a technology that automatically determines presence of the water drops on the lens of the camera based on a captured image has been requested. Especially, for a system that constantly needs to recognize the captured images, for example, a system accurately recognizes a position of the vehicle by detecting a white line or a mark on a road based on the images captured by the camera, in a case where water drops are on the lens of the camera, accuracy of recognizing the position of the vehicle may decrease.

SUMMARY OF THE INVENTION

According to one aspect of the invention, an image processing apparatus that processes an image captured by a camera having a lens includes a microcomputer configured to: detect a candidate region of the captured image, the candidate region serving as a candidate for a water drop region affected by a water drop on the lens of the camera, based on an edge strength of each pixel in the captured image; estimate, based on the candidate region, a circle that includes the candidate region; and determine whether or not the candidate region is part of the water drop region based on the edge strength of some of the pixels in the circle.

Thus, the image processing apparatus is configured to determine, based on the captured image, whether or not a water drop is on the lens of the camera.

According to another aspect of the invention, the microcomputer determines that the candidate region is part of the water drop region in a case where the edge strength of the pixels in a center region of the circle is less than a predetermined threshold value.

Thus, the image processing apparatus is configured to determine, based on the captured image, whether or not a water drop is on the lens of the camera.

Therefore, an object of the invention is to provide an image processing apparatus and a water drop removing system that are configured to determine, based on a captured image, whether or not a water drop is on a camera.

These and other objects, features, aspects and advantages of the invention will become more apparent from the following detailed description of the invention when taken in conjunction with the accompanying drawings.

DESCRIPTION OF THE EMBODIMENTS

Embodiments of an image processing apparatus and a water drop removing system of the present invention will be describes with reference to the attached drawings. This invention is not limited by the embodiments described below. The description below explains, as an example, a case in which the image processing apparatus determines whether a water drop is on a lens of a camera that is provided on a rear portion of a vehicle to capture images of an area behind the vehicle.

Moreover, a determination mechanism of the image processing apparatus of the embodiment will be described below with reference to FIG. 1, and then detailed configurations of the image processing apparatus and the water drop removing system of the embodiment will be described with reference to FIG. 2 and subsequent drawings.

(Determination Mechanism of the Embodiment)

Figure 1:
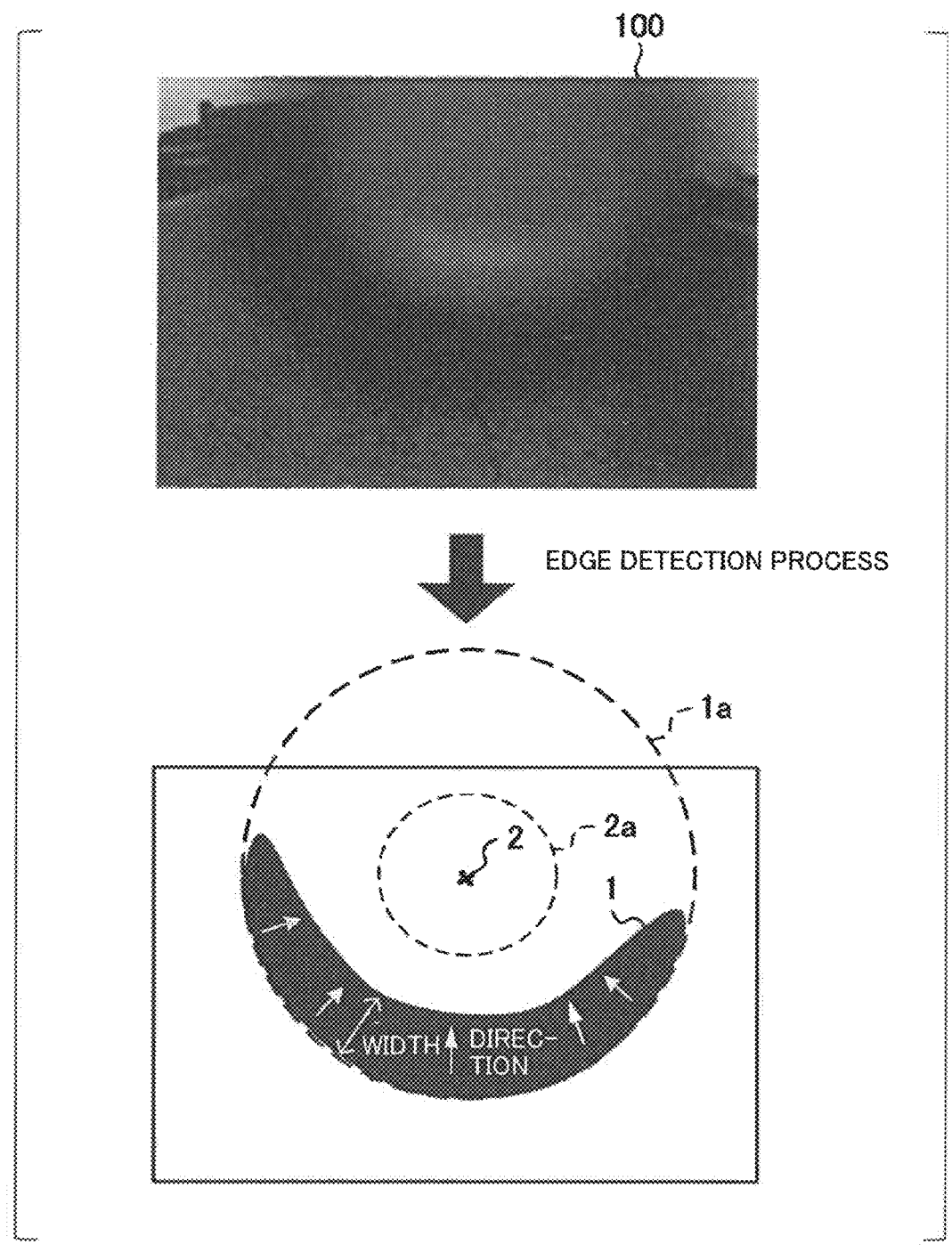
FIG. 1 illustrates a determination mechanism of an image processing apparatus of an embodiment.

FIG. 1 illustrates the determination mechanism of the image processing apparatus of the embodiment. FIG. 1 illustrates an example of a captured image 100 of surroundings of the vehicle captured by the camera in a state in which a water drop is on the lens of the camera. The captured image 100 includes a water drop region (image of a water drop) that is unclear affected by the water drop on the lens of the camera. The water drop region includes a gray, unclear and substantially circle-shaped region and a black, unclear and substantially arc-shaped region including a gray and unclear region.

The gray, unclear and substantially circle-shaped region is a thin center portion of the water drop. The black, unclear and substantially arc-shaped region is a thick end portion of the water drop.

Conventional water drop removing apparatuses need to be operated manually. Therefore, in a case where a captured image is unclear because the captured image includes such a water drop region, a system or the like that accurately recognizes a position of a host vehicle by detecting a white line and a mark on a road by capturing images by a camera, cannot detect the white line and the mark on the road until the water drop removing apparatus is operated manually. Thus, accuracy of recognizing the position of the host vehicle may be decreased.

The image processing apparatus of this embodiment determines whether or not the water drop region is included in the captured image captured by the camera to determine whether or not the water drop is on the lens of the camera. Moreover, the water drop removing system of this embodiment is configured to automatically remove the water drop based on a result determined by the image processing apparatus. The determination mechanism of this embodiment will be described below.

First, a well-known edge detection process is performed for the captured image 100 to detect an edge strength of each pixel (difference in luminance from a neighboring pixel). Then, a group of pixels of which the edge strengths are in a predetermined range is extracted to detect a candidate region 1 serving as a candidate of the water drop region. The candidate region 1, as illustrated in a lower drawing of FIG. 1, corresponds to the black, unclear and substantially arc-shaped region because experiments found that the edge strengths of the pixels included in the black unclear region are in the predetermined range from a first predetermined threshold value to a second predetermined threshold value. Then, a circle 1a corresponding to the candidate region 1 is estimated based on a plurality of noticeable points included in the detected candidate region 1.

If an edge strength in a center region 2a in a predetermined range from a center 2 of the estimated circle 1a is smaller than a predetermined threshold value, the candidate region 1 is determined to be the water drop region (more precisely, a partial portion of the water drop region) because change in luminance in the gray unclear region described above is relatively small so that the region is a relatively low frequency region.

Moreover, the black unclear region within the water drop region is caused by a shape of a thick end of the water drop and a width of the black unclear region is greater than a predetermined length. Edges of pixels in the black unclear region are in a direction toward a center of the water drop region so as to meet one another. Thus, it is possible to determine whether or not the candidate region is the water drop region, based on the edge directions of the pixels in the candidate region 1.

Each edge direction is defined by a vector based on the edge strengths along two axes one of which is in a horizontal direction and the other is in a vertical direction, orthogonal to each other, in the captured image. For example, in a case of a positive vector, an edge thereof points to a greater luminance from a small luminance.

A first embodiment below describes a case in which whether a water drop is on the camera, based on an edge strength in the circle 1a estimated from the candidate region 1.

Moreover, a second embodiment below describes a case in which whether a water drop is on the camera is determined based on an edge direction of a pixel in the candidate region 1. It is possible to determine successfully whether a water drop is on the camera based on the captured image in both cases.

(First Embodiment)

A concrete configuration of the embodiment will be described below. FIG. 2 illustrates a block diagram showing configurations of an image processing apparatus and a water drop removing system of the first embodiment.

Figure 2:
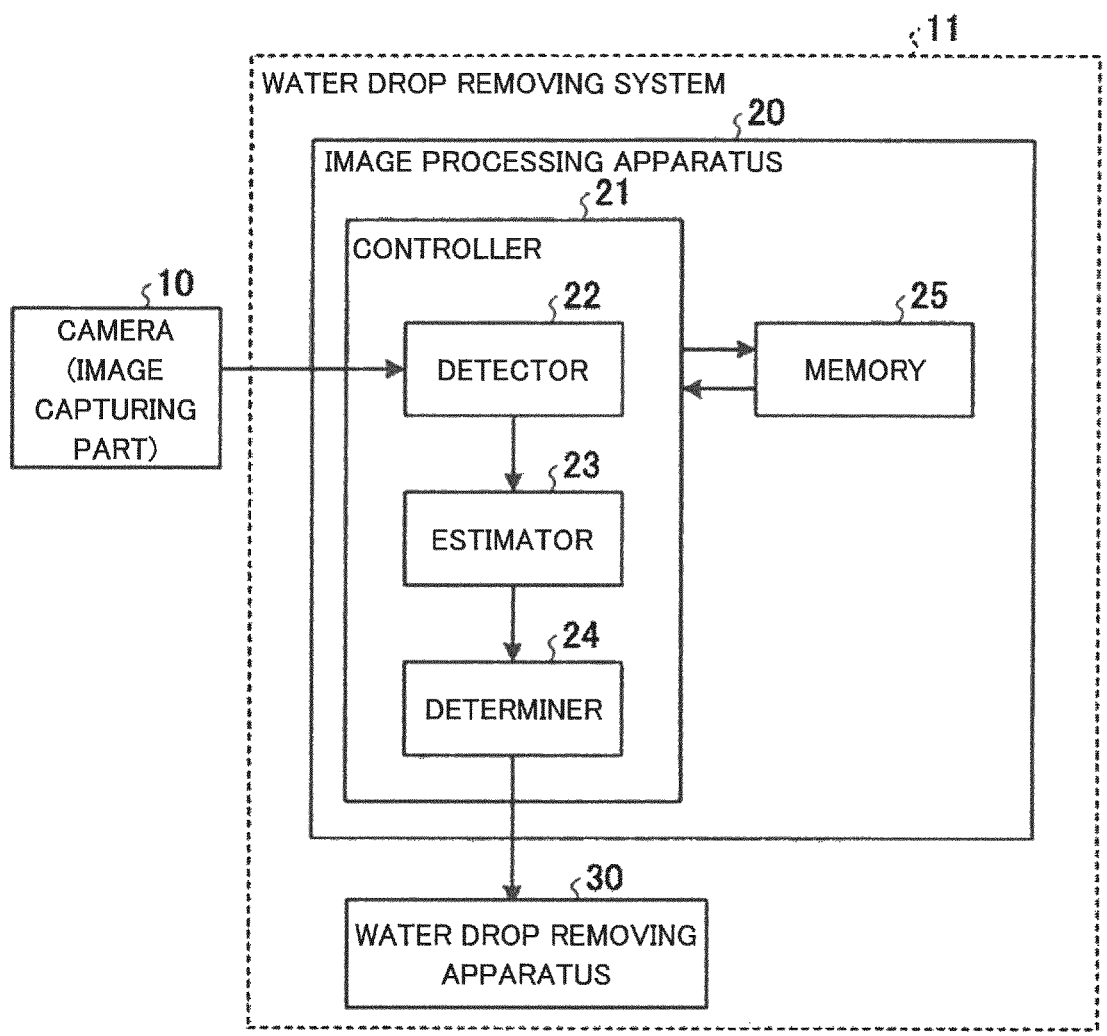
FIG. 2 illustrates a block diagram showing configurations of an image processing apparatus and a water drop removing system of a first embodiment.

A water drop removing system 11 illustrated in FIG. 2 includes an image processing apparatus 20 and a water drop removing apparatus 30.

The image processing apparatus 20 determines whether or not a water drop is on a lens of a camera 10 based on the captured image 100 captured by the camera 10 that is an image capturing part, and sends a determined result to the water drop removing apparatus 30. A concrete configuration of the image processing apparatus 20 will be described later.

The water drop removing apparatus 30 automatically removes the water drop on the lens of the camera 10 that is the image capturing part, based on the determined result sent from the image processing apparatus 20. The water drop removing apparatus 30 includes, for example, an air compressor, a hose and a nozzle, and removes the water drop by emitting compressed air compressed by the air compressor from the nozzle to the camera 10 via the hose. However, the water drop removing apparatus 30 is not limited to this, but the water drop removing apparatus 30 may emit wash solution to the camera 10 or may wipe the camera 10 with a camera wiper.

The water drop removing system 11 of the first embodiment is configured to determine whether or not the water drop is on the camera 10 based on the captured image 100, and to automatically remove the water drop on the camera 10 based on a determined result. Thus, the water drop removing system 11 is configured to constantly remove water drops from the camera 10.

The camera 10 that is kept free from water drops due to the water drop removing system 11 may capture images through the lens or may be an optical sensor that obtains information of a target in surroundings of a vehicle. More specifically, the camera 10 may be, for example, a front camera that captures an image of an area in front of the vehicle, a side camera that captures an image of an area lateral to the vehicle, a rear camera that captures an image of an area behind the vehicle and other various optical sensors.

The image processing apparatus 20 is a microcomputer that includes a controller 21 (a CPU) and a memory 25. The controller 21 performs an edge detection process for the captured image 100, an estimation process based on a detected result from the detection process, a determination process of determining whether or not a water drop is on the lens of the camera 10, etc. The memory 25 stores various process conditions and parameters, beforehand, that are used for the detection process, the estimation process and the determination process performed by the controller 21, and sends the stored process conditions and parameters to the controller 21 as needed. Moreover, the memory 25 stores the detected result and an estimated result from the processes performed by and sent from the controller 21.

The controller 21 includes a detector 22, an estimator 23 and a determiner 24.

The detector 22 receives the captured image 100 captured by the camera 10 that is the image capturing part. Then, the detector 22 performs the edge detection process for the captured image 100 to derive an edge strength of each pixel. The detector 22 detects an aggregation of pixels of which the derived edge strengths are in the predetermined range, as the candidate region 1 to serve as the candidate of the water drop region unclear affected by the water drop. In a case where the candidate region 1 is the water drop region, the candidate region 1 is substantially arc-shaped so that it is recommended that the detector 22 should detect only an arc-shaped region of the substantially arc-shaped region, as the candidate region 1. Then, the detector 22 stores derived results of the edge strengths and the detected result of the candidate region 1 into the memory 25. The candidate region 1 stored in the memory 25 is to be determined by the determiner 24.

The estimator 23 receives the detected result of the candidate region 1. Then, the estimator 23 estimates the circle 1a in which the candidate region 1 is inscribed, based on the detected result of the candidate region 1. Then, the estimator 23 stores the estimated result of the circle 1a into the memory 25.

The determiner 24 receives the derived results of the edge strengths, the detected result of the candidate region 1, the estimated result of the circle 1a and the like stored in the memory 25. Then, the determiner 24 determines, based on the extracted results, the detected result, the estimated result and the like, whether or not the candidate region 1 stored in the memory 25 as a target to be determined is the water drop region to determine whether or not a water drop is on the lens of the camera 10. Then, the determiner 24 sends the determined result to the water drop removing apparatus 30.

An image processing performed by the controller 21 will be described more concretely with reference to FIGS. 3 and 4.

Figure 3:
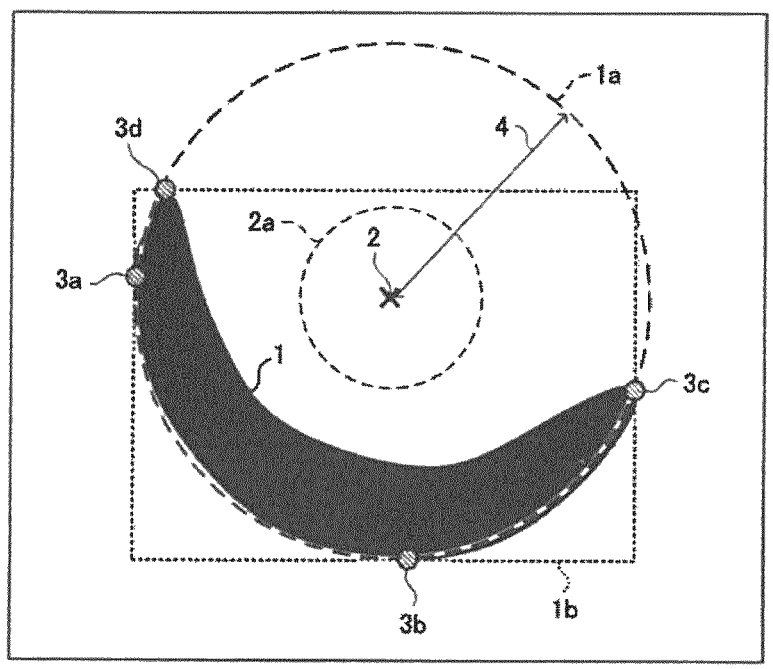
FIG. 3 illustrates an outline of image processing of the first embodiment.
Figure 4:
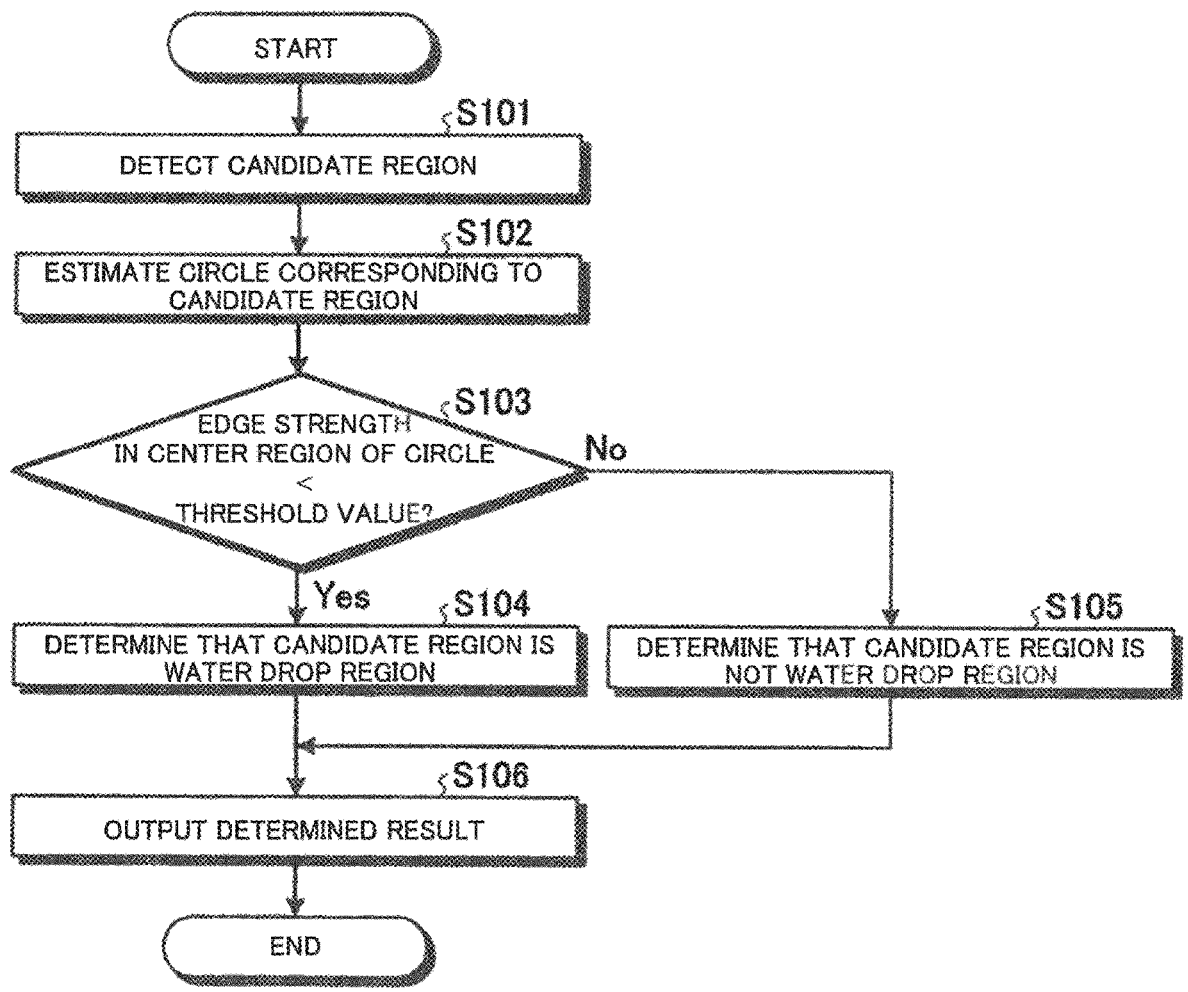
FIG. 4 is a flowchart showing process steps performed by the image processing apparatus of the first embodiment.

FIG. 3 illustrates an outline of the image processing of the first embodiment. FIG. 4 is a flowchart showing process steps performed by the image processing apparatus of the first embodiment.

The detector 22 receives the captured image 100 captured by the camera 10 that is the image capturing part. Next, the detector 22 detects edges, using a known edge detection method that, for example, differentiates luminance of each pixel of the received captured image 100. Then, the detector 22 derives an edge strength of each pixel of the captured image 100. In this embodiment, edges are detected by using luminance of each pixel.

However, the edges may be detected for each color element value (R value, G value, B value, etc.) of each pixel. In this case, a value to be added to the edge strength or a greatest strength for each color element value may be regarded as the edge strength of the pixel.

Next, the detector 22 detects the aggregation of pixels of which the derived edge strengths are in the predetermined range from the first predetermined threshold value to the second predetermined threshold value (the first predetermined threshold value≤the predetermined range≤the second predetermined threshold value), as the candidate region 1 that is the candidate of the water drop region (a step S101). At this time, it is recommended that only an arc-shaped region that is a substantially arc-shaped should be detected as the candidate region 1.

Then, the estimator 23 estimates the circle 1a in which the candidate region 1 is inscribed, based on the detected candidate region 1 (a step S102). In the step S102, for example, a method below may be used as a method of estimating the circle 1a.

As illustrated in FIG. 3, the estimator 23 extracts a plurality of noticeable points 3a to 3d (hereinafter referred to collectively as "noticeable points 3") that are defined at intersections of the candidate region 1 with a rectangle 1b in which the detected candidate region 1 is inscribed. Here, for example, a rectangle having two sides extending in the horizontal direction and other two sides extending in the vertical direction may be chosen as the rectangle 1b. In this case, a point smallest in the horizontal direction (the noticeable point 3a), a point greatest in the vertical direction (noticeable point 3b), a point greatest in the horizontal direction (noticeable point 3c) and a point smallest in the vertical direction (noticeable point 3d) are extracted, as the noticeable points 3 in the candidate region 1. The rectangle 1b may not necessarily be a rectangle having two sides extending in the horizontal direction and the other two sides extending in the vertical direction. A rectangle having a side tilting from the horizontal direction or the vertical direction may be chosen as the rectangle 1b.

The estimator 23 estimates the center 2 that is located a substantially equal distance away from a plurality of the extracted noticeable points 3, and then estimates the circle 1a having the center 2 as a center and passing through the plurality of noticeable points 3. Here, the estimated center 2 does not need to be exactly an equal distance away from the plurality of noticeable points 3. For example, if there is a point exactly an equal distance away from the noticeable points 3 but the point is located between pixels, a plurality of pixels included in a vicinity of the point may be regarded as the center 2. Moreover, the circle 1a does not need to passing through all of the noticeable points 3. For example, the circle 1a may pass near a part of the noticeable points 3.

Next, the determiner 24 determines whether or not the candidate region is the water drop region, based on the edge strength in the estimated circle 1a. For example, as illustrated in FIG. 3, the determiner 24 determines the edge strength in the center region 2a in the predetermined range from the center 2 (a step S103).

In a case where an average edge strength in the center region 2a is smaller than a predetermined threshold value (Yes in the step S103), the determiner 24 determines that the candidate region 1 is the water drop region (more exactly, part of the water drop region) (a step S104). In other words, the determiner 24 determines that a water drop is on the lens of the camera 10.

On the other hand, in a case where the average edge strength in the center region 2a is greater than the predetermined threshold value (No in the step S103), the determiner 24 determines that the candidate region 1 is not the water drop region (a step S105).

Then, the determiner 24 outputs a determined result to the water drop removing apparatus 30 (a step S106), and the process ends.

The image processing apparatus 20 of the first embodiment determines whether or not a water drop is on the lens, using a fact that while luminance in the circle 1a varies, edge strengths in the center region 2a are small.

For example, the center region 2a of the first embodiment may be a circle having the center 2 as a center and having a radius smaller than a radius 4 of the circle 1a. It is recommended that the center region 2a should have the center 2 as the center and should have a radius smaller than a half of the radius 4. It is more recommended that the center region 2a should have a radius smaller than a quarter of the radius 4.

In the first embodiment, the average edge strength in the center region 2a is determined. However, only an edge strength of one pixel equivalent to the center 2, not the center region 2a, may be determined. In this case, in a case where the edge strength in the center 2 is smaller than the threshold value, the determiner 24 determines that the candidate region 1 is the water drop region. In a case where the edge strength in the center 2 is greater than the threshold value, the determiner 24 determines that the candidate region 1 is not the water drop region.

In the step S103 in the first embodiment, the determiner 24 determines whether the candidate region is the water drop region, using the edge strength derived by the detector 22. However, the determiner 24 may determine whether or not the candidate region is the water drop region, using a parameter (parameter substantially indicating an edge strength, such as spatial frequency) different from the edge strength derived by the detector 22.

Here described will be a case where an object other than a water drop is on the lens of the camera 10. In this case, the candidate region 1 that is the aggregation of the pixels of which the edge strengths are in the predetermined range is not arc-shaped, but is, for example rectangle-shaped or circle-shaped. An edge strength in a region corresponding to the center region 2a of the candidate region 1 is not smaller. Therefore, in a case where the candidate region 1 is rectangle-shaped or circle-shaped or where the edge strength in the center region estimated based on the candidate region 1 is high, the object on the camera 10 is determined not to be a water drop.

Therefore, the image processing apparatus of the first embodiment is configured to accurately determine whether or not an object on the lens of the camera is a water drop.

(Modification 1)

An image processing apparatus 20 of a modification 1 of the first embodiment will be described with reference to FIG. 3.

In an embodiment described below, an element different from the configuration of the embodiment described above will be mainly described. Same reference numbers are given to configuration elements already described in the embodiment, and in some cases, explanation of those elements will be omitted.

In the step S102 in the first embodiment, the circle 1a is estimated. In the modification 1, a determiner 24 determines whether or not a radius 4 of the estimated circle 1a is equal to or less than a predetermined reference radius for a reason below.

In a case where a size of a water drop on a lens of a camera 10 is greater than a predetermined size, the water drop tends to fall due to gravity, vibration of a vehicle or other reasons. Thus, in a case where a candidate region is greater than the predetermined size, the candidate region can be regarded as a region of, for example, an object other than the water drop.

In a case where the radius 4 of the circle 1a is equal to or less than the reference radius, the process moves to the step S103 and the determiner 24 performs the process described above. Therefore, in this case, too, the determiner 24 determines that a candidate region 1 is a water drop region in the case where an edge strength in a center region 2a is smaller than a predetermined threshold value.

On the other hand, in the case where the radius 4 of the circle 1a is greater than the reference radius, the candidate region 1 is determined not to be the water drop region.

A value of the foregoing reference radius is calculated based on a physical size of the object on the lens relative to a size of the lens of the camera 10, a size of an imaging sensor of the camera 10, solution, etc.

It is possible to more accurately determine whether the water drop is on the camera 10 by the image processing apparatus of the modification 1.

(Modification 2)

An image processing apparatus 20 of a modification 2 of the first embodiment will be described with reference to FIGS. 5 and 6.

Figure 5:
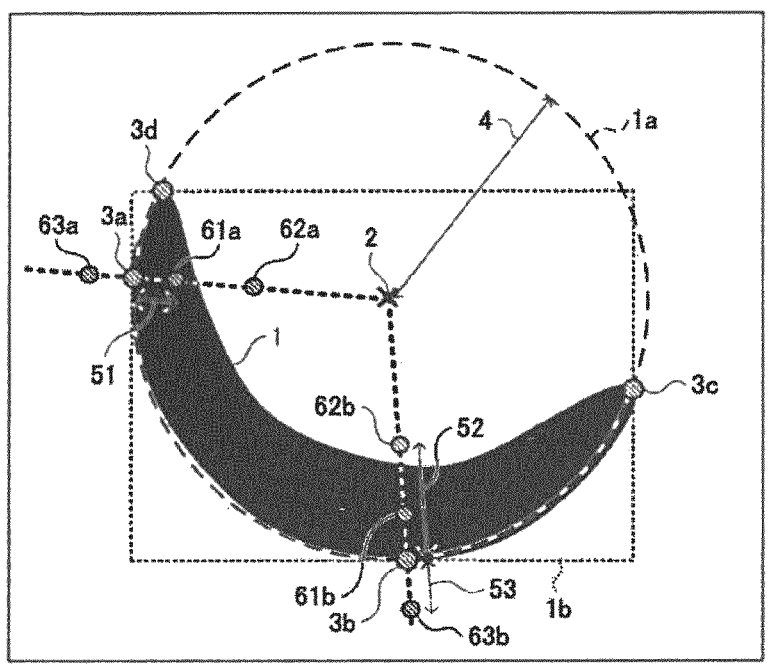
FIG. 5 illustrates an outline of image processing of a modification of the first embodiment.
Figure 6:
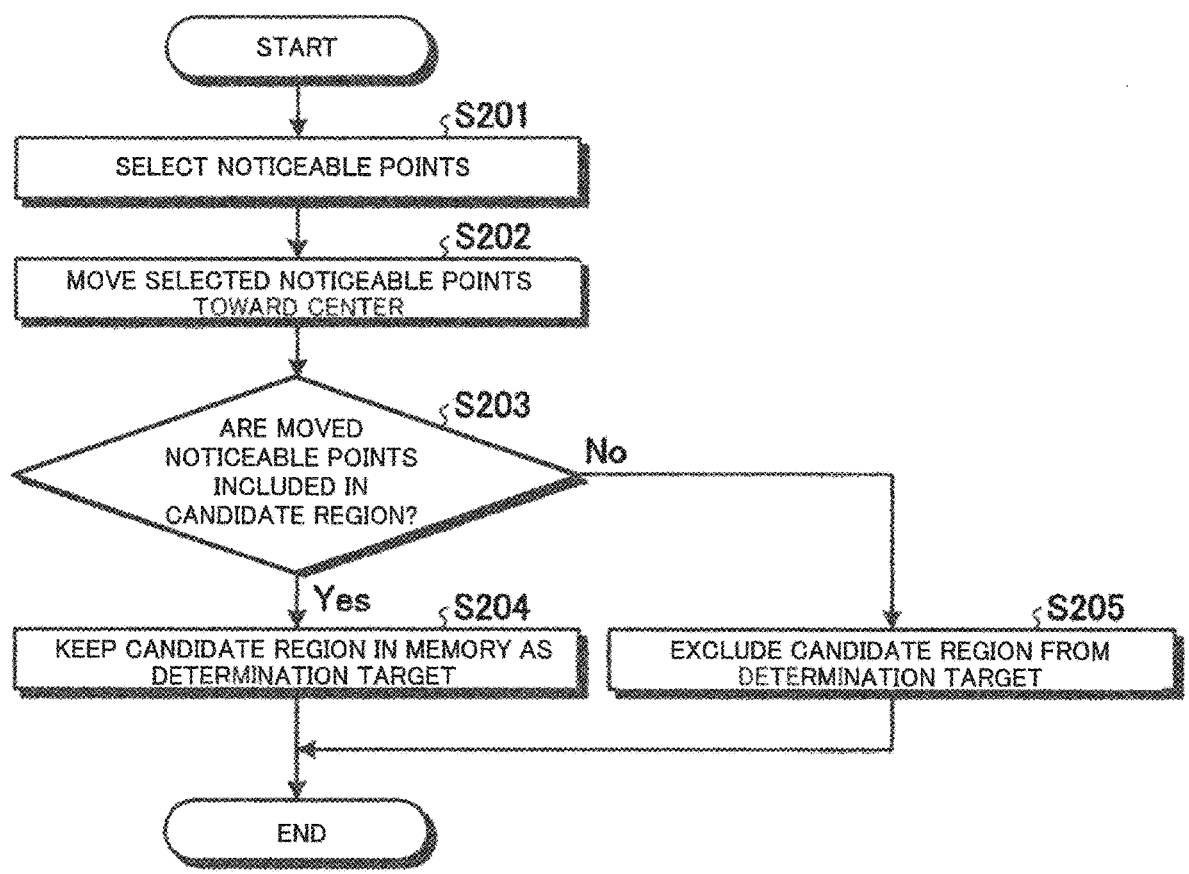
FIG. 6 is a flowchart showing process steps performed by an image processing apparatus of the modification of the first embodiment.

FIG. 5 illustrates an outline of image processing of the modification 2 of the first embodiment. FIG. 6 is a flowchart showing process steps performed by the image processing apparatus of the modification 2 of the first embodiment.

In the modification 2, validity of a candidate region 1 is determined easily by use of a fact that a black unclear region of a water drop region (refer to FIG. 1) has a predetermined width.

In the modification 2, a detector 22 selects noticeable points 3 that are defined at intersections of the candidate region 1 with a rectangle 1b in which the candidate region 1 is inscribed (a step S201). For example, noticeable points 3a and 3b are selected in FIG. 5.

Next, the detector 22 moves the selected noticeable points 3 toward a center 2 by a predetermined reference distance 51 (a step S202). In FIG. 5, points 61a and 61b are positions of the noticeable points 3a and 3b, respectively, after the noticeable points 3a and 3b have been moved toward the center 2.

Next, the detector 22 determines whether or not the moved noticeable points are included in the candidate region 1 (a step S203).

Here, in a case where the moved noticeable points are included in the candidate region 1 (Yes in the step S203), the detector 22 keeps this candidate region 1 in a memory 25 as a determination target to be determined by a determiner 24 (a target to be determined as the water drop region) because the detected candidate region 1 has a high probability of water drop region (a step S204). For example, in FIG. 5, since both of the points 61a and 61b are included in the candidate region 1, the candidate region 1 is stored as the determination target to be determined by the determiner 24.

Moreover, in a case where the moved noticeable points are not included in the candidate region 1 (No in the step S203), the detector 22 deletes the candidate region 1 from the memory 25 to exclude this candidate region 1 from the determination target to be determined by the determiner 24 because the detected candidate region 1 has a low probability of the water drop region (a step 205). Then, the process ends.

In the modification 2, a value of the reference distance 51 is set by calculating a width of the black unclear region of a standard water drop region (refer to FIG. 1) derived from an experiment and the like.

In the modification 2, it is possible to easily select an appropriate region for the candidate region 1 that serves as a candidate of the water drop region. Thus, it is possible to reduce an entire process amount of a controller 21.

Therefore, the image processing apparatus 20 of the modification 2 is configured to determine whether a water drop is on a camera 10 more speedily.

(Modification 3)

It is possible to increase accuracy of detecting the candidate region 1 in the image processing apparatus 20 of the modification 2 by increasing a number of positions to which noticeable points are moved, i.e. positions of the noticeable points 3 after being moved. This modification 3 will be described with reference to FIG. 5 again.

The modification 3 detects a candidate region 1, using a fact that edge strengths of pixels inside and outside a black unclear region of a water drop region (refer to FIG. 1) is not in the predetermined range.

In the modification 3, a detector 22 moves the selected noticeable points 3 toward a center 2 by a reference distance 52 (positions 62a and 62b). Moreover, the detector 22 moves the selected noticeable points 3 away from the center 2 by a reference distance 53 (positions 63a and 63b).

Next, the detector 22 determines whether or not the moved noticeable points are included in the candidate region 1. Here, in a case whether the moved noticeable points are not included in the candidate region 1, the detector 22 keeps the detected candidate region 1 in a memory 25 as a determination target to be determined by a determiner 24. For example, since the positions 62a, 62b, 63a and 63b of the moved noticeable points 3 are not included in the candidate region 1 in FIG. 5, the candidate region 1 is kept maintained as the determination target to be determined by the determiner 24.

In the modification 3, in a case where none of a plurality of the moved noticeable points are included in the candidate region 1, the detector 22 keeps the detected candidate region 1 in the memory 25 as the determination target to be determined by the determiner 24. On the other hand, even in a case where one or more of the plurality of moved noticeable points are not included in the candidate region 1, for example, in a case where a majority of the plurality of moved noticeable points are not included in the candidate region 1, the detector 22 may keep the detected candidate region 1 in the memory 25 as the determination target to be determined by the determiner 24.

In the modification 3, a value of the reference distance 52 may be set by calculating a width or a size of a center region of the black unclear region (refer to FIG. 1) of a standard water drop region derived from an experiment and the like. Moreover, a value of the reference distance 53 in the modification 3 is set, such that the moved noticeable points will be far enough away from the black unclear region.

As compared to the modification 2, the modification 3 increases accuracy of detecting the candidate region 1 by increasing the number of positions of the moved noticeable points 3. Therefore, in a case where a region has been wrongly detected as the candidate region 1 by noise, it is possible to accurately select only the candidate region 1 of a water drop as the determination target to be determined by the determiner 24.

Therefore, the image processing apparatus 20 in the modification 3 is configured to determine whether a water drop is on the camera 10 more accurately.

(Modification 4)

Figure 7:
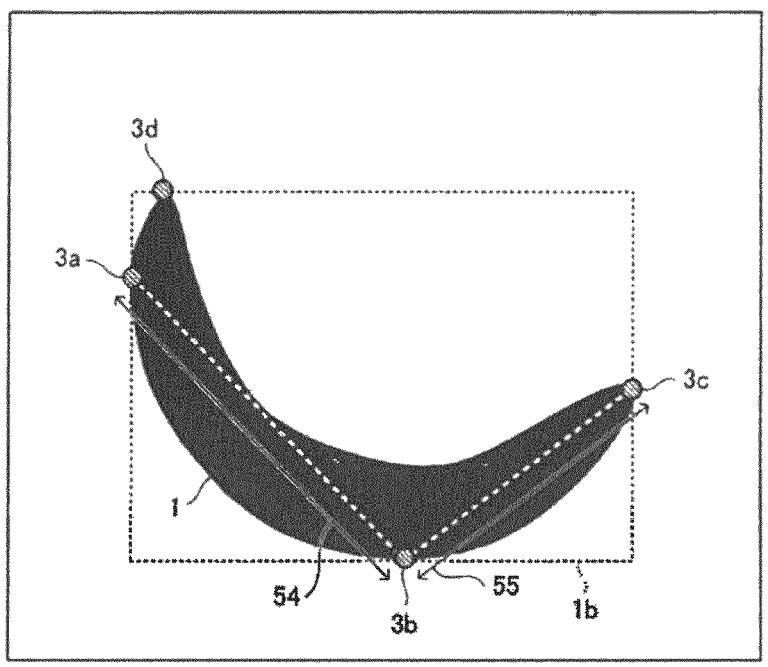
FIG. 7 illustrates an outline of image processing of another modification of the first embodiment.

An image processing apparatus 20 in a modification 4 of the first embodiment will be described with reference to FIG. 7. FIG. 7 illustrates an outline of image processing of the modification 4 of the first embodiment.

Since, in many cases, a water drop gravitates downward due to the gravity and a thick lower end of the water drop is formed. Therefore, in many cases, a shape of a candidate region 1 corresponding to a black unclear region of a water drop region formed in the lower end of the water drop is substantially bilaterally symmetric. Therefore, the modification 4 evaluates whether or not the shape of the candidate region 1 is substantially bilaterally symmetric.

In the modification 4, an estimator 23 selects a rectangle 1b in which the candidate region 1 is inscribed and three noticeable points 3 that are defined at three intersections with the candidate region 1. For example, in a case where the candidate region 1 is convex downward (concave upward) as shown in FIG. 7, a point (3a) smallest in a horizontal direction, a point (3b) greatest in a vertical direction and a point (3c) greatest in the horizontal direction can be selected as the noticeable points 3.

Moreover, the candidate region 1 is convex upward in some cases. This happens, for example, when a water drop is on a lower portion of the camera 10 and only an upper portion of the black unclear region is captured in the captured image. Thus, in a case of an upward-convex candidate region 1 as described above, the point smallest in the horizontal direction, the point greatest in the horizontal direction and the point smallest in the vertical direction may be selected as the noticeable points.

In any case above, in order to evaluate whether the candidate region 1 is substantially bilaterally symmetric, the three neighboring points next to each other on a convex outer end of the candidate region 1 are selected as the noticeable points 3.

Next, a detector 22 determines whether a ratio between a first distance 54 and a second distance 55 is not in a predetermined range. The first distance 54 is a distance between the neighboring noticeable points 3a and 3b next to each other, among the selected noticeable points 3a, 3b and 3c, along the candidate region 1. The second distance 55 is a distance between the neighboring noticeable points 3b and 3c next to each other along the candidate region 1.

In a case where the ratio between the first distance 54 and the second distance 55 is in the predetermined range, the candidate region 1 is determined to be substantially bilaterally symmetric. In this case, the detector 22 keeps the detected candidate region 1 in a memory 25 as a determination target to be determined by the determiner 24.

On the other hand, in a case where the ratio between the first distance 54 and the second distance 55 is not in the predetermined range, the detector 22 deletes a region detected as the candidate region 1 from the memory 25 to exclude the detected region from the determination target to be determined by the determiner 24.

In the modification 4, it is possible to easily select an appropriate region as the candidate region 1 that serves as a candidate of the water drop region, similarly to the modification 2. Thus, it is possible to reduce the entire process amount of the controller 21.

Therefore, the image processing apparatus 20 of the modification 4 is configured to determine the water drop on the camera 10 more speedily.

(Modification 5)

Figure 8:
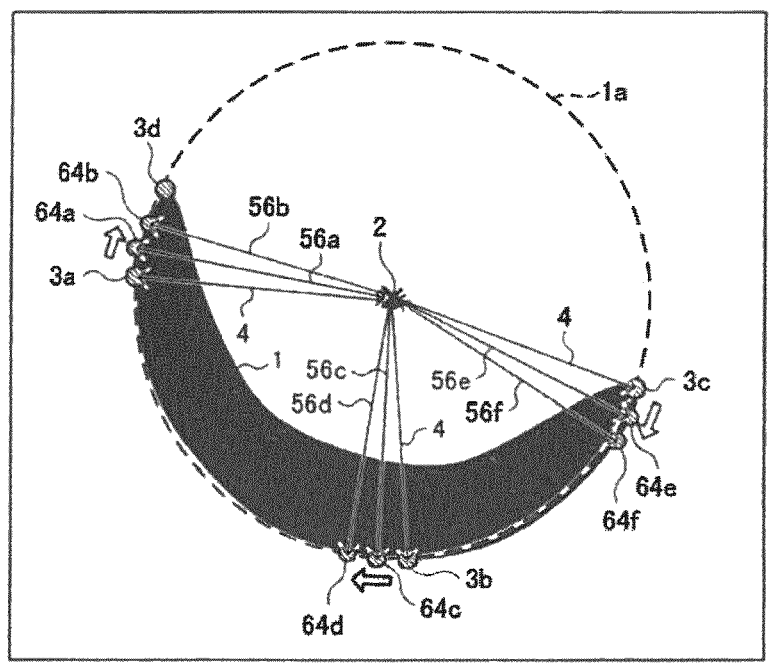
FIG. 8 illustrates an outline of image processing of another modification of the first embodiment.

An image processing apparatus 20 in a modification 5 of the first embodiment will be described with reference to FIG. 8. FIG. 8 illustrates an outline of image processing of the modification 5 of the first embodiment.

As shown in FIG. 8, a circle 1a in which a candidate region 1 is inscribed can be estimated based on the detected candidate region 1. In a case where the candidate region 1 is arc-shaped, an outer end of the candidate region 1 is located near the circle 1a. Therefore, whether or not the outer end of the candidate region 1 is located near the circle 1a is evaluated in the modification 5.

A detector 22 selects the foregoing noticeable points 3 in the modification 5. Noticeable points 3a, 3b and 3c are selected in FIG. 8. In the modification 5, the three noticeable points 3 may be selected as shown in FIG. 8, or one or two noticeable points may be selected. It is recommended that three noticeable points should be selected because the outer end of the candidate region 1 in a wider range can be evaluated.

Next, the detector 22 moves the selected noticeable points 3 along the outer end of the candidate region 1 by a predetermine distance unit. For example, the selected three noticeable points 3 are moved clockwise in FIG. 8. The noticeable point 3a is moved to a position 64a and then to a position 64b, and the noticeable point 3b is moved to a position 64c and then to a position 64d, and the noticeable point 3c is moved to a position 64e and then to a position 64f.

Next, the detector 22 determines whether or not a ratio between a radius 4 of the circle 1a and a distance 56 from each of the positions 64 of the moved noticeable points 3 to a center 2 is not in a predetermined range. For example, in FIG. 8, it is determined whether a ratio between the radius 4 and each of distances 56a to 56f corresponding to the positions 64a to 64f of the moved noticeable points 3 is not in the predetermined range.

In a case where the ratio between the radius 4 and the distance 56 between the position 64 of the moved noticeable points 3 and the center 2 is in the predetermined range, the detector 22 keeps the detected candidate region 1 in the memory 25 as a determination target to be determined by the determiner 24. Moreover, in a case where the ratio between the radius 4 and the distance 56 is not in the predetermined range, the detector 22 deletes a region detected as the candidate region 1 from the memory 25 to exclude the detected region from the determination target to be determined by the determiner 24.

In the modification 5, in a case where a deformed region of an object other than a water drop is detected as the candidate region 1, it is possible to accurately select only the candidate region 1 of the water drop as the determination target to be determined by the determiner 24.

Therefore, the image processing apparatus of the modification 5 is configured to determine a water drop on the camera 10 more accurately.

The modification 5 can increase accuracy of estimating the circle 1a corresponding to the candidate region 1, using the positions to which the noticeable points 3 are moved along the outer end of the candidate region 1. A concrete method of this image processing will be described below.

An estimator 23 extracts a center candidate that is an equivalent distance away from each of the selected noticeable points 3a, 3b and 3c. Moreover, the estimator 23 extracts another center candidate that is an equivalent distance away from each of a plurality of the positions 64a, 64c and 64e to which the noticeable points 3a, 3b and 3c are moved, respectively, by a predetermined distance. Further, the estimator 23 extracts another center candidate that is an equivalent distance away from each of a plurality of the positions 64b, 64d and 64f to which the noticeable points 3a, 3b and 3c are moved, respectively, by a predetermined distance. As described above, a plurality of the center candidates are extracted based on the positions of the moved noticeable points 3 along the outer end of the candidate region 1.

Next, the estimator 23 estimates the center 2 based on the plurality of extracted center candidates. For example, a point located at a center of the plurality of center candidates may be detected as the center 2, or a center candidate estimated most among the plurality of center candidates may be estimated as the center 2.

As described above, since the center 2 is estimated based on the plurality of center candidates, even if a difference in position of the noticeable point 3 is caused by a noise and the like, a position of the center 2 can be detected more accurately.

(Second Embodiment)

Next, a configuration of an image processing apparatus 20a of the second embodiment will be described. The second embodiment determines whether or not a water drop is on a lens of a camera 10 based on edge directions of pixels in a candidate region 1 among the determination mechanisms shown in FIG. 1.

Figure 9:
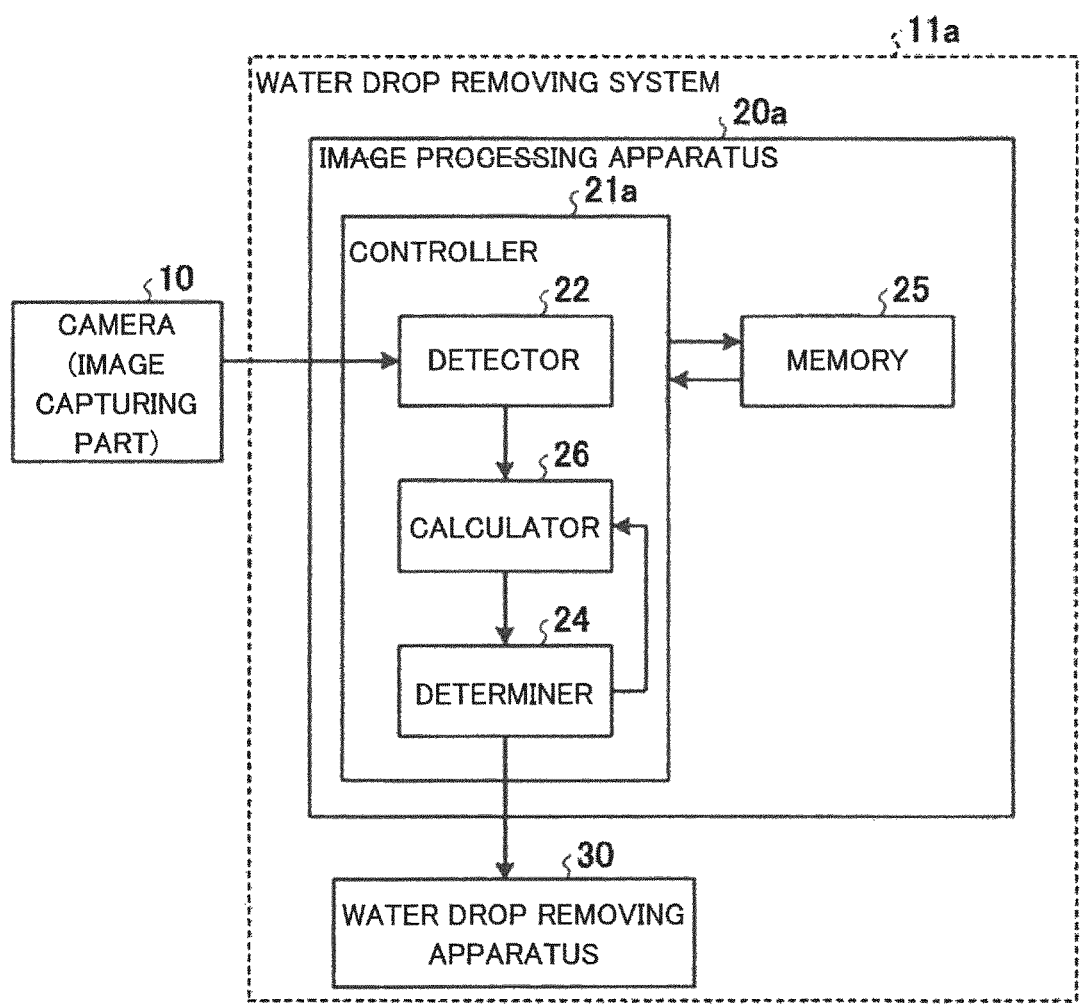
FIG. 9 illustrates a block diagram showing configurations of an image processing apparatus and a water drop removing system of a second embodiment.

FIG. 9 illustrates a block diagram showing configurations of the image processing apparatus 20a and a water drop removing system 1a of the second embodiment. Being different from the first embodiment, a controller 21a of the second embodiment includes a calculator 26 instead of the estimator 23.

The controller 21a of the second embodiment includes a detector 22, the calculator 26 and a determiner 24. The detector 22 is the same as the detector 22 in the first embodiment.

The calculator 26 receives a detected result of the candidate region 1. Then, the calculator 26 calculates an edge direction of each pixel in the candidate region 1, and then the calculator 26 stores a calculated result of the edge direction of each pixel in the candidate region 1 into a memory 25.

The determiner 24 receives a derived result of each edge strength, a detected result of the candidate region 1, the calculated result of each edge direction, etc. Then, the determiner 24 determines whether or not a water drop is on the camera 10 based on an extracted result, the detected result, the calculated result, etc. and then sends a determined result to a water drop removing apparatus 30.

Image processing performed by the controller 21a will be described below more specifically with reference to FIGS. 10 and 11.

Figure 10:
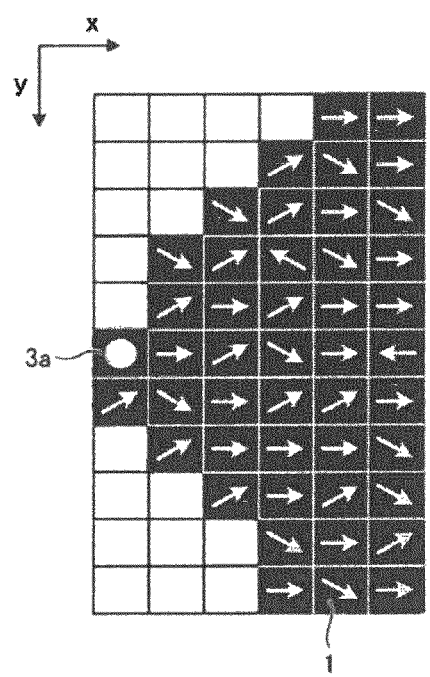
FIG. 10 illustrates an outline of image processing of the second embodiment.
Figure 11:
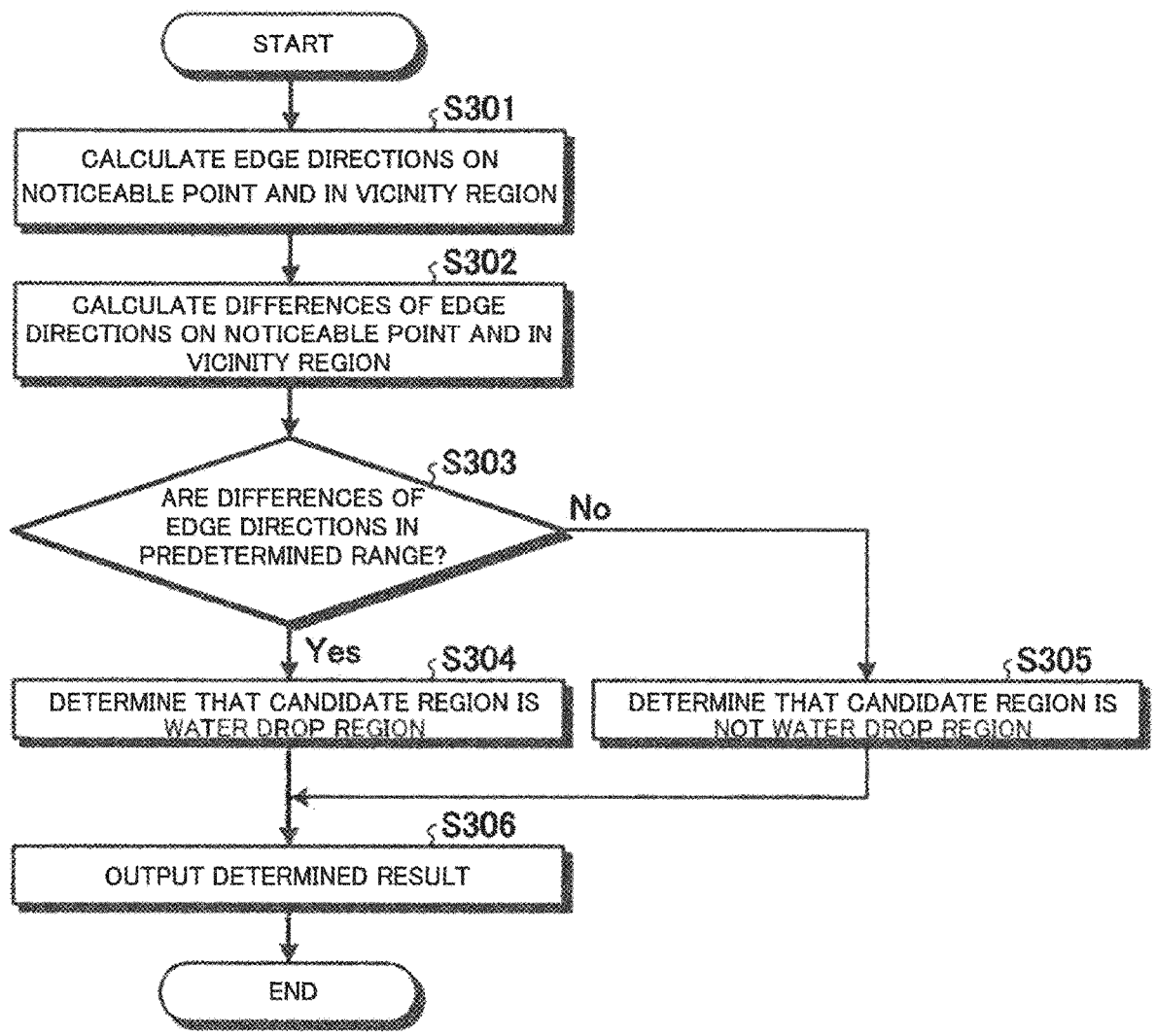
FIG. 11 is a flowchart showing process steps performed by the image processing apparatus of the second embodiment.

FIG. 10 illustrates an outline of the image processing of the second embodiment. FIG. 11 is a flowchart showing process steps performed by the image processing apparatus 20a of the second embodiment.

The detector 22 derives an edge strength of each pixel in a captured image 100 captured by the camera 10 similarly to the first embodiment, and then detects the candidate region 1 based on the derived edge strength (refer to the step S101).

Next, the calculator 26 calculates the edge direction of each pixel in the candidate region 1 based on the edge strength in the captured image 100. For example, the calculator 26 calculates the edge direction of each pixel on a noticeable point 3 and in a vicinity region thereof (a step S301). The noticeable points 3 are defined at intersections of the candidate region 1 with a rectangle 1b in which the candidate region 1 is inscribed, and the vicinity region is an area in a predetermined range from the noticeable points 3. For example, as shown in FIG. 10, the calculator 26: sets a noticeable point 3a in the candidate region 1 as a base point; selects, as the vicinity region, a region within five pixels each in negative and positive directions from the base point; and then calculates the edge direction of each pixel on the noticeable point 3a and the vicinity region.

The calculator 26 evaluates differences in the edge directions of pixels on the noticeable point 3 and in the vicinity region (a step S302).

Next, the determiner 24 determines whether or not the water drop is on the camera 10, based on the edge directions of the pixels in the candidate region 1. For example, in the second embodiment, the determiner 24 determines whether or not the differences of the edge directions of pixels on the noticeable point 3 and in the vicinity region are in a predetermined range (a step S303).

In a case where the detected candidate region 1 corresponds to a black, unclear and substantially arc-shaped region (end portion of the water drop) of the water drop region of the water drop on the camera, the edge directions of pixels in the predetermined range tend to point one same direction (a direction toward a center of the circle). For example, as shown in FIG. 10, in a case where the noticeable point 3a smallest in a horizontal direction is a base point, the edges directions in the vicinity region of the noticeable point 3a tend to point in a positive horizontal direction.

In a case where differences of the edge directions of the pixels on the noticeable point 3 and in the vicinity region is in the predetermined range (Yes in the step S303), the determiner 24 determines that the candidate region 1 is the water drop region (more accurately, part of the water drop region) (a step S304). In other words, the determiner 24 determines that the water drop is on the camera 10.

Moreover, in a case where differences of the edge directions of the pixels on the noticeable point 3 and in the vicinity region are not in the predetermined range (No in the step S303), the determiner 24 determines that the candidate region 1 is not the water drop region (a step S305). Then, the determiner 24 outputs a determined result to the water drop removing apparatus 30 (a step S306), and the process ends.

In the second embodiment, a region within five pixels each toward the negative and positive directions from the noticeable point 3a in the candidate region 1 is selected as the vicinity region. However, the vicinity region is not limited to the region within five pixels each from the noticeable point 3a in the negative and positive directions. The vicinity region may be selected such that the differences of the edge directions are in the predetermined range. Moreover, the noticeable point 3a is selected as the base point of the vicinity region. However, another noticeable point may be selected or a pixel in the candidate region 1 other than the noticeable point may be selected.

Moreover, in the second embodiment, the differences of the edge directions on the noticeable point 3 and the vicinity region may be calculated based on the dispersion of the edge directions of the pixels.

In the second embodiment, it is possible to determine whether or not a water drop is on the camera without estimating the circle 1a and the center 2 in the first embodiment. Thus, it is possible to reduce an entire process amount of the controller 21a.

Therefore, the image processing apparatus 20a of the second embodiment is configured to speedily determine whether or not the water drop is on the camera 10.

(Modification 6)

An image processing apparatus 20a of a modification 6 of the second embodiment will be described with reference to FIGS. 12 and 13.

Figure 12:
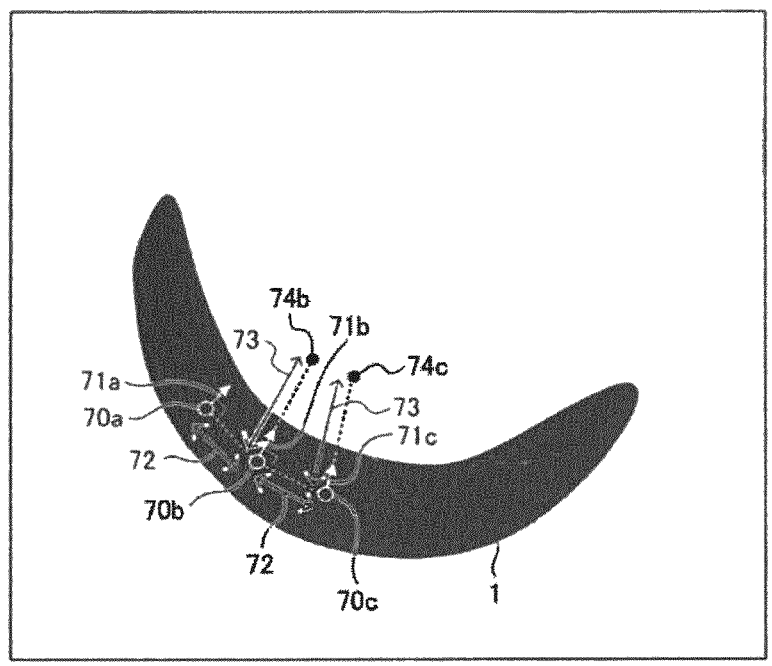
FIG. 12 illustrates an outline of image processing of a modification of the second embodiment.
Figure 13:
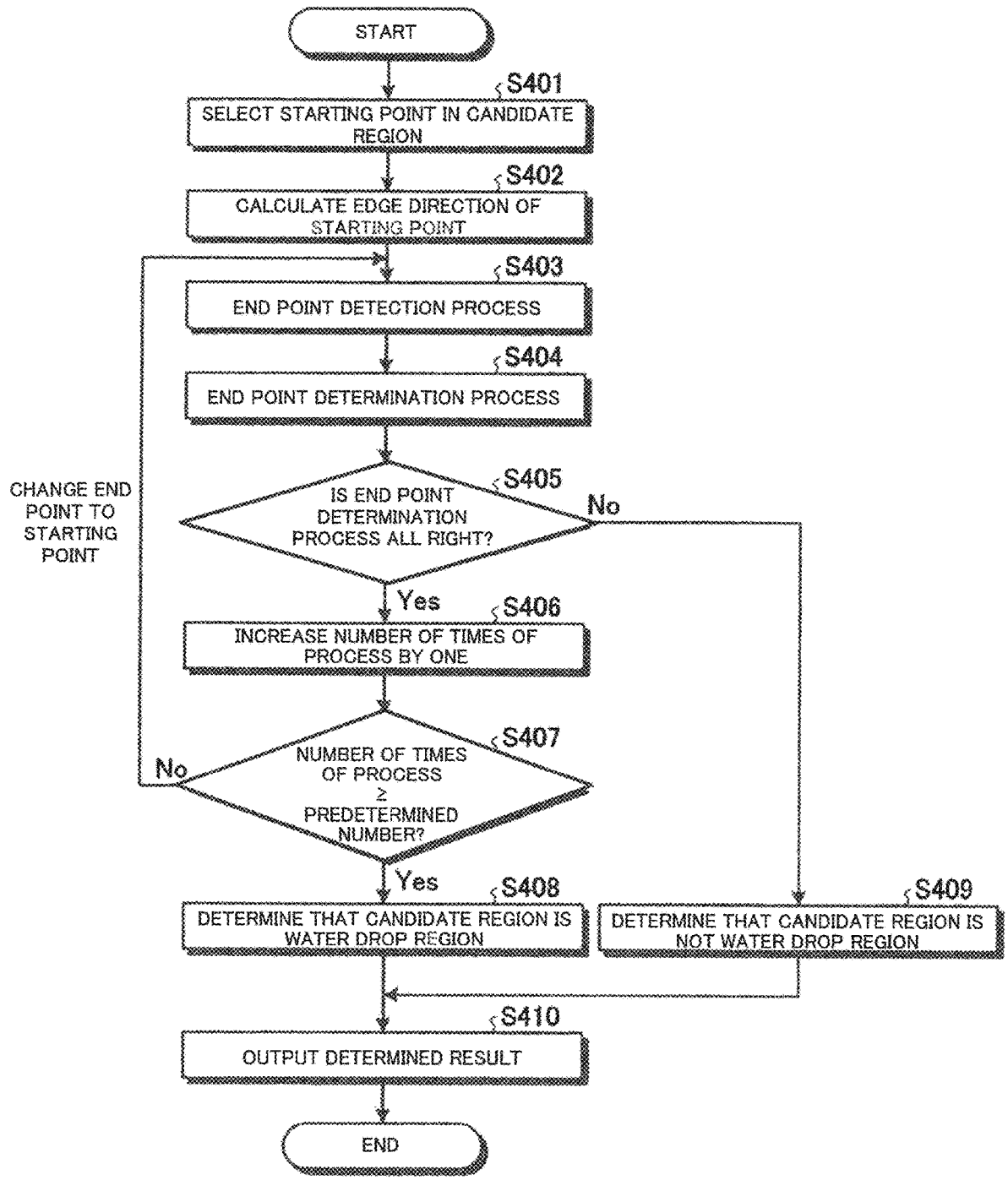
FIG. 13 is a flowchart showing process steps performed by an image processing apparatus of the modification of the second embodiment.

FIG. 12 illustrates an outline of image processing of the modification 6 of the second embodiment. FIG. 13 is a flowchart showing process steps performed by an image processing apparatus 20a of the modification 6 of the second embodiment.

In the modification 6, a determiner 24 determines whether a candidate region 1 is a water drop region, using a fact that edge directions of pixels in a black unclear region of the water drop region are toward one same point so as to meet one another.

In the modification 6, a calculator 26 selects one point in the candidate region 1 as a starting point (a step S401). For example, as shown in FIG. 12, a pixel 70a, the starting point, is selected. Then, the calculator 26 calculates an edge direction 71a of the pixel 70a, the starting point (a step S402).

Next, the calculator 26 performs an end point detection process of detecting an end point that is located at a predetermined position relative to the starting point (a step S403). For example, as shown in FIG. 12, the calculator 26 detects, as the end point, a pixel 70b a predetermined distance 72 away from the pixel 70a, the starting point, in the vertical direction relative to the edge direction 71a of the pixel 70a (the starting point). Then, the calculator 26 calculates an edge direction 71b of the pixel 70b, the end point.

As shown in FIG. 12, in the modification 6, the pixel 70b, the end point, is selected from amongst pixels located at three o'clock from the pixel 70a, the starting point. However, a pixel located at nine o'clock from the pixel 70a may be selected. In the end point detection process to be repeatedly performed, as described later, in the modification 6, an end point may be selected from amongst the pixels located at a same o'clock as the previous process, relative to a new starting point.

Next, the determiner 24 performs an end point determination process to determine whether or not the edge direction of the starting point and the edge direction of the end point are toward one same point so as to meet each other (a step S404). More specifically, as shown in FIG. 12, in a case where the edge direction 71b of the pixel 70b located at three o'clock relative to the edge direction 71a of the pixel 70a is in a predetermined angle range in a positive counterclockwise direction, the edge directions 71a and 71b of the pixels 70a and 70b are determined to be toward one same point so as to meet each other.

If the end point is selected from pixels located at nine o'clock relative to the starting point in the end point detection process, in a case where the edge direction of the end point relative to the edge direction of the starting point is in a predetermined angle range in a positive clockwise direction, the edge directions of the end point and the starting point are determined to be toward one same point so as to meet each other.

Then, in a case where the edge direction of the end point relative to the edge direction of the starting point is in the predetermined angle range (Yes in the step S405), the determiner 24 increases, by one, number of times that the process has been performed, and stores the number into a memory 25 (a step S406).

Next, the determiner 24 determines whether or not the number of times that the process has been performed stored in the memory 25 is equal to or greater than a predetermined number of times (a step S407). In a case where the number of times that the process has been performed is equal to or greater than the predetermined number of times (Yes in the step S407), the determiner 24 determines that the candidate region 1 is the water drop region (a step S408).

In a case where the number of times that the process has been performed is less than the predetermined number of times (No in the step S407), the determiner 24 instructs the calculator 26 to newly perform the end point detection process in which the end point (in this case, the point 70b) in the previous process is used as a starting point.

In the modification 6, as shown in FIG. 12, for example, in a case where the pixel 70a is the starting point, the pixel 70b is detected in the end point detection process. Then, in a case where a result of the end point determination process for the pixel 70b relative to the pixel 70a is all right, the number of times that the process has been performed is increased by one. Then, in the case where the number of times that the process has been performed is less than the predetermined number of times, the end point detection process is newly performed, using the pixel 70b as a starting point. Accordingly, a pixel 70c is detected as a new end point. Then, the end point determination process is newly performed for the pixel 70c relative to the pixel 70b, using an edge direction 71c of the pixel 70c.

The modification 6 extracts a plurality of the pixels that are located a predetermined distance 72 away from each other along the candidate region 1 within the candidate region 1 by repeatedly performing the end point detection process and the end point determination process, as described above. At a same time, it is possible to determine whether or not edge directions of the plurality of extracted pixels are toward one same point so as to meet each other. Moreover, number of the pixels to be detected in the candidate region 1 can be set by setting the number of times of the process to the predetermine number.

In a case where the result of the end point determination process for the end point relative to the starting point is not all right (No in the step S405), the determiner 24 determines that the candidate region 1 is not the water drop region (a step S409). Then, the determiner 24 outputs the determined result to the water drop removing apparatus 30 (a step S410), and the process ends.

In the modification 6, the number of pixels to be selected in the candidate region 1 can be arbitrarily set based on desired detection accuracy and a desired detection speed.

Moreover, the distance 72 between the pixels selected in the candidate region 1 can be arbitrarily set based on number of pixels to be selected. For example, in a case where the number of the pixels to be selected is small, a greater distance is set. In a case where the number of the pixels to be selected is great, a smaller distance is set. Thus, the pixels can be selected from an overall region of the candidate region 1.

Moreover, an angle difference of the edge direction of the end point relative to the edge direction of the starting point can be arbitrarily set based on the distance 72 between the pixels and the like.

The modification 6 extracts pixels spread in a broad range within the candidate region 1 and then determines whether or not a water drop is on the camera based on the edge directions of the extracted pixels. Thus, it is possible to accurately determine whether or not the candidate region 1 is in the predetermined shape (are-shaped).

Moreover, it is possible to effectively make the determination described above by repeatedly performing the end point detection process and the end point determination process in the modification 6. Therefore, it is possible to perform the efficient determination process.

Thus, the image processing apparatus 20a of the modification 6 is configured to determine whether or not a water drop is on the lens of the camera 10 efficiently and accurately.

(Modification 7)

It is possible for the image processing apparatus 20a of the modification 6 to perform a different end point detection process and a different end point determination process to determine whether or not a water drop is on the lens of the camera 10. This modification 7 will be described with reference to FIG. 12.

In the modification 7, a calculator 26 performs an end point detection process of detecting two end points located at predetermined positions relative to a starting point. For example, as shown in FIG. 12, the calculator 26 detects, as a first end point, a pixel 70b located a predetermined distance 72 away from a pixel 70a, the starting point, in a direction vertical to an edge direction 71a of the pixel 70a (starting point). Then, the calculator 26 calculates an edge direction 71b of the pixel 70b, the first end point.

Moreover, the calculator 26 performs an additional end point detection process of detecting, as a second end point, a pixel 74b located a predetermined distance 73 away from the pixel 70b, the first end point, in the edge direction 71b of the pixel 70b, the first end point.

Next, a determiner 24 performs an end point determination process of determining whether or not the first and second end points are included in a candidate region 1. More specifically, as shown in FIG. 12, in a case where the pixel 70b, the first end point, is included in the candidate region 1, but the pixel 74b, the second end point, is not included in the candidate region 1, it is possible to determine that a result of the end point determination process is all right.

In other words, the determination above is to determine whether or not the first end point is located in the candidate region 1 but the second end point is located outside the candidate region 1.

Being the same as the modification 6, in a case where the result of the end point determination process is all right, the determiner 24 refers to number of times that the process has been performed. Then, in a case where number of times that the process has been performed is less than a predetermined number, the determiner 24 instructs the calculator 26 to newly perform the end point detection process in which the point 70b used as the end point in the previous process is used as a starting point.

In the modification 7, as shown in FIG. 12, for example, in a case where the pixel 70a is the starting point, the pixel 70b and the pixel 74b are detected in the end point detection process. Then, in a case where a result of the end point determination process for the pixel 70b and the pixel 74b is all right, and where the number of times that the process has been performed is less than the predetermined number, the end point detection process is newly performed, using the pixel 70b as the starting point. Thus, a pixel 70c and a pixel 74c are detected as new end points. Then, the end point determination process is performed for the pixel 70c and the pixel 74c.

As compared to the modification 6, two end points are detected in one end point detection process in the modification 7, and the end point determination process is performed based on those end points. Therefore, it is possible to accurately determine whether the candidate region 1 is in a predetermined shape even in a case where number of times that the end point detection process and the end point determination process have been performed is less as compared to the modification 6.

Thus, the image processing apparatus 20a of the modification 7 is configured to speedily determine whether or not a water drop on the camera 10.

In the foregoing embodiments and modifications, in a case where a captured image is entirely dark or bright, there is a case where a difference between a smallest luminance and a greatest luminance is not great in the captured image. In the case where a difference between the smallest luminance and the greatest luminance is not great, edge strengths of pixels in the captured image 100 are generally small. As a result, it is difficult to accurately detect the candidate region 1 based on the edge strength of each pixel in the captured image 100.

In the case above, it is effective to perform image processing called dynamic range expansion process before the edge detection process for the captured image 100 is performed by a detector 22. The dynamic range expansion process can enlarge the difference between the smallest luminance and the greatest luminance in the captured image 100. Thus, the detector 22 accurately detects the candidate region 1.

Moreover, in the foregoing embodiments and modifications, there is a case where a pixel to be included in the candidate region 1 (hereinafter referred to as "edge point") is not detected or is falsely detected due to a noise after the edge detection process is performed by the detector 22. Thus, there is a case where a shape of the candidate region 1 that is an aggregation of the edge points is not accurate so that the candidate region 1 is not accurately detected.

In the case above, it is effective to perform image processing called morphological image processing after the edge detection process for the captured image 100 is performed by the detector 22. A missing non-detected edge point can be complemented by image processing called dilation process in the morphological image processing. Moreover, an edge point falsely detected is removed in image processing called erosion process in the morphological image processing. The shape of the candidate region 1 is well arranged so that it is possible to accurately detect the candidate region 1 by performing the dilation process and the erosion process in combination.

In the foregoing embodiments, the detection condition and the determination condition are concretely described by indicating values. However, the values of the conditions are only examples and those conditions are not limited to the foregoing values.

Moreover, the image processing described in the foregoing embodiments and the modifications may be combined with each other. For example, the determination method in the first embodiment may be combined with the determination method in the second embodiment. In other words, only in a case where the candidate region 1 is determined to be a water drop region by both of the determination methods in the first and second embodiments, the candidate region 1 may be finally determined to be the water drop region. Thus, it is possible to increase accuracy of determining whether or not the water drop is on the camera 10. Thus, it is possible to determine whether or not the water drop is on the camera 10 more speedily.

The foregoing embodiments show a case in which the water drop removing system 11 is applied to the camera 10 for a vehicle, as an example. However, use of the water drop removing system 11 is not limited to this. The water drop removing system 11 may be used for a monitoring camera, a security camera and other types of cameras (optical sensors) that are installed inside or outside a building, a road, etc.

In the foregoing embodiments, the image processing apparatus 20 and the image processing apparatus 20a may be mounted in a vehicle or may be mounted outside a vehicle, using a wireless communications and the like to send and receive information to/from a camera (image capturing part) and a water drop removing apparatus.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes an image captured by a camera having a lens, the image processing apparatus comprising a microcomputer configured to:

detect a candidate region of the captured image, the candidate region serving as a candidate for a water drop region affected by a water drop on the lens of the camera, based on an edge strength of each pixel in the captured image;

calculate an edge direction of each pixel in the candidate region; and determine, based on the edge directions, whether or not the candidate region is part of the water drop region, wherein the microcomputer determines that the candidate region is part of the water drop region when the edge direction of each pixel of a plurality of the pixels located a predetermined distance away from each other in the candidate region is directed to a common point.

2. A water drop removing system that removes a water drop from a lens of a camera that captures an image, the water drop removing system comprising:

an image processing apparatus that processes the image; and a water drop removing apparatus that removes the water drop from the lens of the camera, wherein the image processing apparatus includes a microcomputer configured to:

detect a candidate region of the captured image, the candidate region serving as a candidate for a water drop region affected by a water drop on the lens of the camera, based on an edge strength of each pixel in the captured image;

calculate an edge direction of each pixel in the candidate region; and determine, based on the edge directions, whether or not the candidate region is part of the water drop region, and the water drop removing apparatus includes a removing part that removes the water drop from the lens of the camera, based on a signal output by the microcomputer of the image processing apparatus, wherein the microcomputer determines that the candidate region is part of the water drop region when the edge direction of each of the plurality of pixels located a predetermined distance away from each other in the candidate region is directed to a common point.

* * * * *